United States Patent
Thorburn et al.

(10) Patent No.: US 12,305,297 B2
(45) Date of Patent: May 20, 2025

(54) ALKALINE ELECTROLYZER ARRANGEMENT

(71) Applicant: ABB Schweiz AG, Baden (CH)

(72) Inventors: Stefan Thorburn, Västerås (SE);
Andres Leal-Ayala, Ennetbaden (CH);
Matthias Biskoping, Hirschberg (DE);
Daniel Chartouni, Wettingen (CH);
Bernhard Primas, Mannheim (DE);
Kai Koenig, Walldorf (DE); Georg Gutermuth, Heidelberg (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/720,108

(22) PCT Filed: Dec. 7, 2022

(86) PCT No.: PCT/EP2022/084720
§ 371 (c)(1),
(2) Date: Jun. 14, 2024

(87) PCT Pub. No.: WO2023/110564
PCT Pub. Date: Jun. 22, 2023

(65) Prior Publication Data
US 2024/0417862 A1    Dec. 19, 2024

(30) Foreign Application Priority Data
Dec. 16, 2021    (EP) .................................... 21214975

(51) Int. Cl.
*C25B 9/00*    (2021.01)
*C25B 1/04*    (2021.01)
(Continued)

(52) U.S. Cl.
CPC ................. *C25B 1/04* (2013.01); *C25B 9/75* (2021.01); *C25B 9/77* (2021.01); *C25B 15/023* (2021.01); *C25B 15/08* (2013.01)

(58) Field of Classification Search
CPC .... C25B 1/04; C25B 9/77; C25B 9/75; C25B 15/023; C25B 15/08
See application file for complete search history.

(56) References Cited

U.S. PATENT DOCUMENTS

| 6,669,826 B1 | 12/2003 | Milgate, Jr. et al. |
| 2006/0222912 A1 | 10/2006 | Smith |

(Continued)

FOREIGN PATENT DOCUMENTS

| CN | 104812708 A | 7/2015 |
| CN | 111926852 | 8/2021 |

(Continued)

OTHER PUBLICATIONS

Irena; "Green Hydrogen Cost Reduction: Scaling up Electrolysers to Meet the 1.5C Climate Goal"; International Renewable Energy Agency; Abu Dhabi; 2020; 106 Pages.

(Continued)

*Primary Examiner* — Zulmariam Mendez
(74) *Attorney, Agent, or Firm* — Whitmyer IP Group LLC (57) ABSTRACT

The invention relates to an alkaline electrolyzer arrangement for producing hydrogen gas. The arrangement includes a first alkaline electrolyzer unit and a second alkaline electrolyzer unit, each one of the first and second alkaline electrolyzer units including a first end plate, a second end plate and a plurality of electrolyzer cells forming a cell stack arranged between the first and second end plates. The alkaline electrolyzer arrangement further including a load bearing surface arranged between the first alkaline electrolyzer unit and the second alkaline electrolyzer unit such that the second (Continued)

alkaline electrolyzer unit is arranged vertically above the first alkaline electrolyzer unit and is supported by the load bearing surface.

16 Claims, 7 Drawing Sheets

(51) Int. Cl.
    *C25B 9/75*     (2021.01)
    *C25B 9/77*     (2021.01)
    *C25B 15/023*     (2021.01)
    *C25B 15/08*     (2006.01)

(56) References Cited

U.S. PATENT DOCUMENTS

| | | | |
|---|---|---|---|
| 2011/0210012 A1* | 9/2011 | Sioli | C25B 1/04 205/742 |
| 2014/0251796 A1 | 9/2014 | Hauschild et al. | |
| 2015/0298998 A1 | 10/2015 | Legzdins | |
| 2016/0145749 A1 | 5/2016 | Nigel | |
| 2020/0141013 A1 | 5/2020 | Garcés Barón | |

FOREIGN PATENT DOCUMENTS

| | | |
|---|---|---|
| JP | 2003129266 A | 5/2003 |
| JP | 2010084225 A | 4/2010 |
| WO | 2015152761 A1 | 10/2015 |

OTHER PUBLICATIONS

Enapter; "AEM Multicore, Lowest-cost flexible hydrogen at megawatt-scale"; Oct. 1, 2021; 7 Pages.
Extended European Search Report; Application No. 21214975.1; Completed: Jul. 21, 2022; Issued: Jul. 29, 2022; 9 Pages.
International Preliminary Report on Patentability; Application No. PCT/EP2022/084720; Issued: Nov. 20, 2023; 44 Pages.
International Search Report and Written Opinion of the International Searching Authority; Application No. PCT/EP2022/084720; Completed: May 4, 2023; Mailing Date: May 17, 2023; 14 Pages.
Chinese Office Action; Application No. 202280077439.7; Completed: Dec. 4, 2024; Issued: Dec. 7, 2024; 12 Pages.
Enapter; "Introducing the AEM Multicore"; Retrieved from Internet: Feb. 10, 2025; 7 Pages.
Japanese Office Action; Application No. 2024-533911; Completed: Jan. 6, 2025; Mailing Date: Jan. 14, 2025; 7 Pages.

* cited by examiner

ALKALINE ELECTROLYZER ARRANGEMENT

TECHNICAL FIELD

The present invention relates generally to an alkaline electrolyzer arrangement for producing hydrogen gas, the alkaline electrolyzer arrangement comprising a first alkaline electrolyzer unit and a second alkaline electrolyzer unit.

BACKGROUND

As more countries pursue decarbonization strategies, hydrogen as an energy transporter will most likely become more important. Use of hydrogen is particularly relevant in sectors in which direct electrification is challenging, e.g. in the manufacturing of steel and certain chemicals, in long-haul transport, shipping and aviation. Preferably, the produced hydrogen has low carbon footprint, and is ultimately green, e.g. by being produced by electrolysis of water using electricity from renewable sources. In addition to regulations and market design, the cost of hydrogen production is still a barrier.

Electrolyzers, or water electrolyzers, are electrochemical devices used to split water molecules into hydrogen and oxygen by passage of an electrical current. Electrolyzers comprises electrolyzer cells at which the electrochemical process occurs. An electrolyzer cell is typically composed of two electrodes (anode and cathode) immersed in a liquid electrolyte or adjacent to a solid electrolyte, and a membrane or other porous transport layers which facilitate the transport of reactants and removal of products. At the electrodes, the water is split into oxygen and hydrogen, with ions, typically H+ or OH—, crossing though a liquid or solid membrane electrolyte. The membrane between both electrodes is also responsible for keeping the produced gases (hydrogen and oxygen) separated and avoiding gas mixing.

An electrolyzer typically comprises a plurality of such electrolyzer cells arranged in a cell stack, and arranged between two end plates that provide mechanical support. The cell stack may further include spacers being insulating material between two opposite electrodes in an electrolyzer cell, seals, and frames for further mechanical support. Moreover, a plurality of electrolyzer units can be arranged in an electrolyzer system which include equipment for cooling, processing the hydrogen (e.g. for purity and compression), converting the electricity input (e.g. transformer and rectifier), treating the water supply (e.g. deionization) and gas output (e.g. of oxygen). Such electrolyzer system may e.g. be comprised in a hydrogen producing plant.

Electrolyzers are typically divided into different technologies based on the electrolyte and temperature of operation. For example, alkaline electrolyzers uses a liquid alkaline electrolyte, while proton exchange membrane, PEM, electrolyzers uses a solid polymer electrolyte and solid oxide electrolyzers, SOEC, uses a solid ceramic material as the electrolyte.

All types of electrolyzers suffer from relatively high costs for the production of hydrogen. However, alkaline electrolyzers are typically associated with cheaper catalysts with respect to the platinum metal group-based catalysts normally used for PEM. Moreover, alkaline electrolyzers typically have higher durability due to an exchangeable electrolyte and lower dissolution of anodic catalyst. Moreover, alkaline electrolyzers typically achieves a higher gas purity due to lower gas diffusivity in the alkaline electrolyte.

However, there are still challenges associated with electrolyzers, and in particular for hydrogen plants requiring large surface areas for the installations. This, together with the relatively few installations of large hydrogen plants, calls for a need in making an electrolyzer arrangement more efficient and cost effective.

SUMMARY

An object of the present invention is to overcome at least some of the above problems, and to provide an alkaline electrolyzer arrangement for producing hydrogen gas which, at least to some extent, is improved compared to prior art solutions. This, and other objectives, which will become apparent in the following are accomplished by means of an alkaline electrolyzer arrangement for producing hydrogen gas, the arrangement comprising a first alkaline electrolyzer unit and a second alkaline electrolyzer unit.

According to a first aspect of the present invention, an alkaline electrolyzer arrangement for producing hydrogen gas is provided. The arrangement comprises a first alkaline electrolyzer unit and a second alkaline electrolyzer unit, each one of the first and second alkaline electrolyzer units comprising a first end plate, a second end plate and a plurality of electrolyzer cells forming a cell stack arranged between the first and second end plates, wherein the alkaline electrolyzer arrangement further comprises a load bearing surface arranged between the first alkaline electrolyzer unit and the second alkaline electrolyzer unit such that the second alkaline electrolyzer unit is arranged vertically above the first alkaline electrolyzer unit and is supported by the load bearing surface.

Hereby, surface area for the installation of the electrolyzer arrangement is used more efficient. Stated differently, by using the same amount of surface area for the installation of the electrolyzer arrangement, the capacity of the electrolyzer arrangement is increased. Thus, by the invention, the capacity of the electrolyzer arrangement per surface area is increased. The capacity may e.g. be defined as the hydrogen producing capacity.

It should be understood that when stating that the second alkaline electrolyzer unit is arranged vertically above the first alkaline electrolyzer unit and is supported by the load bearing surface, the second alkaline electrolyzer unit is arranged on top of the first alkaline electrolyzer unit, with the load bearing surface arranged in between the first and second alkaline electrolyzer units. Thus, the second alkaline electrolyzer unit which comprises a first end plate, a second end plate and a plurality of electrolyzer cells forming a cell stack arranged between the first and second end plates, is arranged vertically above the first alkaline electrolyzer unit which comprises a first end plate, a second end plate and a plurality of electrolyzer cells forming a cell stack arranged between the first and second end plates, wherein the second alkaline electrolyzer unit is supported by the load bearing surface.

The first end plate and the second end plate of the first alkaline electrolyzer unit may be referred to as a first unit first end plate and a first unit second end plate, respectively. Moreover, the cell stack of the plurality of electrolyzer cells arranged between the first unit first and second end plates may be referred to as a first unit cell stack. Correspondingly, the first end plate and the second end plate of the second alkaline electrolyzer unit may be referred to as a second unit first end plate and a second unit second end plate, respectively. Moreover, the cell stack of the plurality of electrolyzer cells arranged between the second unit first and second end plates may be referred to as a second unit cell stack.

It should be understood that an electrolyzer cell in the cell stack in each one of the first and second alkaline electrolyzer units, typically comprises two electrodes (an anode and a cathode) separated by a membrane, and operating in a liquid alkaline electrolyte solution (simply referred to as an alkaline electrolyte) to achieve water electrolysis. In use, oxygen gas (and water) is produced at the anode by means of anions of OH, and hydrogen gas (and anions of OH) is produced at the cathode by means of supplied electrons. Alkaline electrolyte and/or water may be continuously supplied to the alkaline electrolyzer unit. The anions of OH is transported from the cathode to the anode via the membrane. Each cell stack of the first and second alkaline electrolyzer units comprises a plurality of such electrolyzer cells.

According to at least one example embodiment, the surface area of the electrodes in the electrolyzer cells in the cell stack in each one of the first and second alkaline electrolyzer units is between 0.5 and 3 m2.

It should be understood that the first alkaline electrolyzer unit is a separate unit to the second alkaline electrolyzer unit. Thus, the electrolyzer cells in the cell stack of the first alkaline electrolyzer unit is separated, and independently operated of, the electrolyzer cells in the cell stack of the second alkaline electrolyzer unit. For example, the electrolyzer cells in the cell stack of the first alkaline electrolyzer unit are arranged in between the first and second end plates of the first alkaline electrolyzer unit, while the electrolyzer cells in the cell stack of the second alkaline electrolyzer unit are not (as they are arranged between the first and second end plates of the second alkaline electrolyzer unit). However, the first and second electrolyzer units may be configured to provide the produced gas (hydrogen and/or oxygen) to a common piping, even though the electrolyzer cells in the cell stack of the first alkaline electrolyzer unit is separated, and independently operated of, the electrolyzer cells in the cell stack of the second alkaline electrolyzer unit.

According to at least one example embodiment, the first and second end plates are base plates, or load carrier plates. Thus, the first and second end plates form the main carrier structure for the cell stack of the associated electrolyzer unit. Typically, the first and second end plates are different to any electrodes of the cell stack.

It should be understood that when stating that the second alkaline electrolyzer unit is arranged vertically above the first alkaline electrolyzer unit and is supported by the load bearing surface, the alkaline electrolyzer arrangement is described in relation to a three-dimensional space. For example, in a Cartesian coordinate system (xyz-system defined by an x-axis, and y-axis and a z-axis), the horizontal plane is defined by the x-axis and the y-axis (i.e. an xy-plane) and the z-axis is a vertical axis perpendicularly cutting through the horizontal plane. In other words, the z-axis, or vertical axis, is parallel to an axis for which the force of gravity follows. Thus, position of the second alkaline electrolyzer unit with regards to the z-axis is higher compared to the position of the first alkaline electrolyzer unit. According to at least one example embodiment, the lowest z-coordinate of the second alkaline electrolyzer unit is higher than the highest z-coordinate of the first alkaline electrolyzer unit.

It should be understood that the second alkaline electrolyzer unit is typically arranged on top of the first alkaline electrolyzer unit. For example, the second alkaline electrolyzer unit is arranged in the same position with regards to the x-axis and y-axis (i.e. in the horizontal plane) as the first alkaline electrolyzer unit. According to at least one example embodiment, the position with regards to the x-axis and y-axis of the second alkaline electrolyzer unit at least partly overlap with the position with regards to the x-axis and y-axis of the first alkaline electrolyzer unit. Thus, the second alkaline electrolyzer unit may be aligned, or slightly off-set, in the horizontal plane (xy-plane) to the first alkaline electrolyzer unit.

According to at least one example embodiment, the load bearing surface is comprised in one of the first and second alkaline electrolyzer units.

Hereby, no separate assembly step is necessary for arranging the load bearing surface such that the second alkaline electrolyzer unit is arranged vertically above the first alkaline electrolyzer unit and is supported by the load bearing surface. Stated differently, the load bearing surface is integrated in one of the first and second alkaline electrolyzer units. Thus, the load bearing surface will be arranged such that the second alkaline electrolyzer unit is arranged vertically above the first alkaline electrolyzer unit and is supported by the load bearing surface, simply by arranging the second alkaline electrolyzer unit vertically above the first alkaline electrolyzer unit.

According to at least one example embodiment, the load bearing surface is comprised in the first alkaline electrolyzer unit. Preferably, the load bearing surface of the first alkaline electrolyzer unit is a top surface of the first alkaline electrolyzer unit. Thus, during assembly of the alkaline electrolyzer arrangement, the first alkaline electrolyzer unit may be placed in its correct position, whereafter the second alkaline electrolyzer unit is arranged on top of the first alkaline electrolyzer unit where it is supported by the load bearing surface of the first alkaline electrolyzer unit. Hereby, assembly of the alkaline electrolyzer arrangement is improved.

According to at least one example embodiment, the load bearing surface is comprised in at least one of the first and second end plates of the first alkaline electrolyzer unit.

Hereby, the load bearing surface is integrated into an already existing component of the first alkaline electrolyzer unit. Thus, the separate load bearing structure arranged in between the first and second alkaline electrolyzer units comprising the load bearing surface can be omitted. Moreover, as the first and second end plates typically are load carrier plates, the load bearing surface is integrated into the main carrier structure for the cell stack of the first alkaline electrolyzer unit. The load bearing surface may be comprised in, or integrated in, the first end plate and/or the second end plate of the first alkaline electrolyzer unit.

According to at least one example embodiment, the electrolyzer cells in the respective cell stack of the first and second alkaline electrolyzer units are stacked vertically.

Hereby, the capacity per surface area can be increased even further. Thus, the electrolyzer cells are sandwiched in a vertical direction, or along the z-axis as described with regards to the previously described Cartesian coordinate system. Thus, the first end plate, the cell stack, and the second end plate are arranged sequentially in the vertical direction. In other words, the centre axis of the first and second alkaline electrolyzer units is a vertical axis. Typically, each electrolyzer cell in such vertical stack arrangement comprises electrodes and membranes sandwiched in a vertical direction, or along the z-axis. According to at least one example embodiment, the electrodes and/or the membranes are inclined, or tilted, relative to the xy-plane in order to avoid gas traps.

For example, the first end plate of the first alkaline electrolyzer unit is arranged on a ground surface of the electrolyzer site for the alkaline electrolyzer arrangement. The second end plate of the first alkaline electrolyzer unit is aligned with, and arranged above, the first end plate such that the vertically arranged cell stack of the first alkaline electrolyzer unit is arranged in between the first and second end plates. The second end plate comprises the load bearing surface which the second alkaline electrolyzer unit is supported upon. Thus, the first end plate of the second alkaline electrolyzer unit is arranged on the second end plate of the first alkaline electrolyzer unit. The second end plate of the second alkaline electrolyzer unit is aligned with, and arranged above, the first end plate such that the vertically arranged cell stack of the second alkaline electrolyzer unit is arranged in between the first and second end plates, and vertically above the first alkaline electrolyzer unit.

According to at least one example embodiment, the first alkaline electrolyzer unit further comprises a planar structure extending from the first end plate to the second end plate, and wherein the planar structure comprises the load bearing surface.

Hereby, a planar structure being a separate load bearing structure to the first and second end plates, and which comprises the load bearing surface is comprised in the first alkaline electrolyzer unit. Such planar structure provides an advantageous support for the second alkaline electrolyzer unit.

According to at least one example embodiment, the planar structure comprises an inner facing surface arranged to face the cell stack of the first alkaline electrolyzer unit, and an outer facing surface arranged to face the second alkaline electrolyzer unit, wherein the outer facing surface is the load bearing surface.

Thus, the previously mentioned top surface of the first alkaline electrolyzer unit is preferably the outer facing surface of the planar structure, and acting as the load bearing surface. Hereby, the arrangement of the second alkaline electrolyzer unit on top of the first alkaline electrolyzer unit is improved.

According to at least one example embodiment, a load bearing structure extends from the first end plate to the second end plate of at least one of the first and second alkaline electrolyzer units. Hereby, the load bearing structure may provide for an increase robustness of the corresponding alkaline electrolyzer unit. For example, the load bearing structure may be configured to compress the electrolyzer cells in the cell stack. Hereby, the connecting rods may be omitted, or at least reduced.

The load bearing structure may for example be attached to a top portion, or a top surface of the first end plate of the first alkaline electrolyzer unit, and attached to a top portion, or a top surface of the second end plate of the first alkaline electrolyzer unit, and thereby extend from the top portion, or top surface of the first end plate to the top portion, or top surface, of the second end plate. The top portion, or top surface, of the end plate is here referring to the portion or surface of the end plate facing the second alkaline electrolyzer unit. As an alternative, the load bearing structure may be attached to a bottom portion, or a bottom surface of the first end plate of the second alkaline electrolyzer unit, and attached to a bottom portion, or a bottom surface of the second end plate of the second alkaline electrolyzer unit, and thereby extend from the bottom portion, or bottom surface of the first end plate to the bottom portion, or bottom surface, of the second end plate. The bottom portion, or bottom surface, of the end plate is here referring to the portion or surface of the end plate facing the first alkaline electrolyzer unit.

According to at least one example embodiment, the load bearing surface is integrated in a load bearing structure (or planar structure) of the first or second alkaline electrolyzer units, or in at least one the first and second end plates of the first alkaline electrolyzer unit, which is in contact with the electrolyte of the corresponding alkaline electrolyzer unit. Thus, the load bearing surface may be integrated in the first alkaline electrolyzer unit by that the structure comprising the load bearing surface is in contact with the electrolyte of the first alkaline electrolyzer unit. Alternatively, the load bearing surface may be integrated in the second alkaline electrolyzer unit by that the structure comprising the load bearing surface is in contact with the electrolyte of the second alkaline electrolyzer unit. For example, in embodiments in which the load bearing surface is comprised in at least one of the first and second end plates of the first alkaline electrolyzer unit, the first and second end plates are in contact with the electrolyte of the first alkaline electrolyzer unit. Moreover, in embodiments in which the load bearing surface is comprised in a load bearing structure or a planar structure extending from the first end plate to the second end plate of at least one of the first and second alkaline electrolyzer units, the load bearing structure or a planar structure may be arranged such that it is in contact with the electrolyte of the corresponding alkaline electrolyzer unit.

According to at least one example embodiment, the electrolyzer cells in the respective cell stack of the first and second alkaline electrolyzer units are stacked horizontally.

Hereby, the conventional cell stack arrangement can be used for the alkaline electrolyzer arrangement. Thus, the electrolyzer cells are sandwiched in a horizontal direction, or along the x-axis or y-axis as described with regards to the previously described Cartesian coordinate system. Thus, the first end plate, the cell stack, and the second end plate are arranged sequentially in the horizontal direction (along the x-axis or y-axis). In other words, the centre axis of the first and second alkaline electrolyzer units is a horizontal axis. Typically, each electrolyzer cell in such horizontal stack arrangement comprises electrodes and membranes sandwiched in a horizontal direction, or along the x-axis or y-axis.

For example, the first and second end plates of the first alkaline electrolyzer unit is arranged on a ground surface of the electrolyzer site for the alkaline electrolyzer arrangement. The first and second end plates of the first alkaline electrolyzer unit is typically aligned in the horizontal direction, and arranged side-by-side, such that the horizontally arranged cell stack of the first alkaline electrolyzer unit is arranged in between the first and second end plates. According to at least one example embodiment, in which the load bearing surface is comprised in the first and second end plates of the first alkaline electrolyzer unit, the load bearing surface is typically divided between a top surface of the first end plate and a top surface of the second end plate, on which the respective first and second end plates of the second alkaline electrolyzer unit are supported upon. Thus, the first end plate of the second alkaline electrolyzer unit is arranged on top of the first end plate of the first alkaline electrolyzer unit, and the second end plate of the second alkaline electrolyzer unit is arranged on top of the second end plate of the first alkaline electrolyzer unit. Thus, the first and second end plates, and the horizontally arranged cell stack arranged therebetween, of the second alkaline electrolyzer unit are arranged vertically above the first alkaline electrolyzer unit.

According to at least one example embodiment, the load bearing surface is a lattice or grid.

Hereby, a strong but yet relatively low-weight load bearing surface is provided. For example, load bearing structure comprising the load bearing surface is arranged as a lattice or a grid. Alternatively, for embodiments in which the load bearing surface is comprised in the first and/or second end plate of the first alkaline electrolyzer unit, the corresponding first and/or second end plate(s) is arranged as a lattice or a grid. For example, the lattice or grid is 3D printed or other otherwise manufactured to provide a structure being configured to bear a high vertical load (i.e. at least corresponding to the weight of the second alkaline electrolyzer unit). By having a lattice or grid as the load bearing surface, transport of gases or liquids to, and/or from, the first and second alkaline electrolyzer units is facilitated, as such transportation may be achieved via the openings in the lattice or grid.

According to at least one example embodiment, the alkaline electrolyzer arrangement further comprises an intermediate load bearing plate arranged between the first and second end plates of the first alkaline electrolyzer unit, wherein the second alkaline electrolyzer unit is at least partly supported by the intermediate load bearing plate.

Such intermediate load bearing plate is typically arranged to encompass a portion of the cell stack, or comprises a centre structure forming a part of the cell stack. Such centre structure may, e.g. comprise a grid or lattice enabling the alkaline electrolyte to flow therethrough. For example, the centre structure is arranged in between two electrodes and may form a dummy cell (i.e. a cell in the cell stack which does not produced hydrogen or oxygen, as there is no applied potential between the electrodes of the dummy cell). The intermediate load bearing plate is typically arranged distant from the first and second end plates, typically by being arranged equidistantly from the first and second end plates. The alkaline electrolyzer arrangement may comprise more than one intermediate load bearing plate. For such embodiments, the plurality of intermediate load bearing plates is arranged along the distance from the first end plate to the second end plate. The intermediate load bearing plate may be referred to as an intermediate load bearing structure.

According to at least one example embodiment, that the second alkaline electrolyzer unit is at least partly supported by the intermediate load bearing plate is achieved by that the load bearing surface is comprised in the intermediate load bearing plate and the first and second end plates of the first alkaline electrolyzer unit. The load bearing surface is typically divided between a top surface of the first end plate, a top surface of the second end plate, and a top surface of the intermediate load bearing plate, on which a respective first end plate, a second end plate and an intermediate plate of the second alkaline electrolyzer unit are supported upon. Thus, for such embodiment, the second alkaline electrolyzer unit comprises an intermediate plate, arranged correspondingly to the intermediate load bearing plate of the first electrolyzer unit, between the first and second end plates of the second alkaline electrolyzer unit. As an alternative, that the second alkaline electrolyzer unit is at least partly supported by the intermediate load bearing plate is achieved by that the load bearing structure is supported by the first and second end plates, and the intermediate load bearing plate, wherein the load bearing structure comprises the load bearing surface as previously described.

According to at least one example embodiment, the alkaline electrolyzer arrangement comprises one or more sensors configured to measure temperature, pressure and/or conductivity, wherein the one or more sensors are integrated in the intermediate load bearing plate. Such integration is advantageous as the sensor(s) can easily be arranged in a mid-section of the cell stack owing to the arrangement of the intermediate load bearing plate.

According to at least one example embodiment, at least the first alkaline electrolyzer unit further comprises at least one connecting rod arranged to extend from the first end plate to the second end plate and being configured to compress the electrolyzer cells in the cell stack, wherein the load bearing surface is distant to the at least one connecting rod.

Thus, the electrolyzer cells in the cell stack of the first alkaline electrolyzer unit is compressed and tightly held within the first and second end plates by the at least one connecting rod. When stating that the load bearing surface is distant to the at least one connecting rod, it should be understood that the load bearing surface is different to the at least one connecting rod. Stated differently, and according to at least one example embodiment, the load bearing surface is not comprised in the at least one connecting rod, or any connecting rod arranged to extend from the first end plate to the second end plate and being configured to compress the electrolyzer cells in the cell stack. However, according to at least one alternative example embodiment, for the above described vertically arranged cell stacks of the first and second alkaline electrolyzer units, the first alkaline electrolyzer unit may comprise at least two connecting rods wherein the respective end surface of the at least two connecting rods facing the second alkaline electrolyzer unit comprises the load bearing surface. Thus, the first end plate of the second alkaline electrolyzer unit may be supported by the end surface of the at least two connecting rods of the first alkaline electrolyzer unit.

Typically, the second alkaline electrolyzer unit also comprises at least one connecting rod arranged to extend from the first end plate to the second end plate of the second alkaline electrolyzer unit, the connecting rod being configured to compress the electrolyzer cells in the cell stack. Thus, the load bearing surface is distant, or different, to the at least one connecting rod.

According to at least one example embodiment, the alkaline electrolyzer arrangement further comprises piping configured to transport produced gas from the electrolyzer cells of the cell stacks, wherein the piping is arranged vertically in between the first and second alkaline electrolyzer units.

Hereby, an efficient way of arranging the piping is provided. For example, the first and second alkaline electrolyzer units may be configured to provide the produced gas to the same piping. For example, the piping comprises a first piping system for handling the produced hydrogen gas, and a second piping system for handling the produced oxygen gas, the second piping system being separated and different to the first piping system.

According to at least one example embodiment, the piping is further configured to transport the alkaline electrolyte (or corresponding solution thereof) and/or water to, and from, the first and second alkaline electrolyzer units. Thus, the piping may comprise a third piping system for handling the alkaline electrolyte and/or water. Typically, the alkaline electrolyte and/or water, is re-circulated out and in of the cell stack.

According to at least one example embodiment, the piping is at least partly comprised in the load bearing structure comprising the load bearing surface previously described. The load bearing structure may furthermore comprise sensors, or metering equipment, for measuring flow of gas or liquid.

According to at least one example embodiment, the load bearing surface is horizontally arranged.

Hereby, an advantageous support for the second alkaline electrolyzer unit is provided. That is, the load bearing surface is typically a horizontal surface extending in the xy-plane.

According to at least one example embodiment, the alkaline electrolyzer arrangement further comprises an encapsulation mantle housing the first and the second alkaline electrolyzer units.

Hereby, any leaking gas from the first and second alkaline electrolyzer units may be trapped inside the encapsulation mantle.

According to at least one example embodiment the alkaline electrolyzer arrangement further comprises a gas sensor configured to detect any leaking gas from the first and second alkaline electrolyzer units, wherein the gas sensor is arranged within the encapsulation mantle vertically above the second alkaline electrolyzer unit.

Thus, an efficient means for detecting leaking gas is provided. The gas sensor is typically configured to detect hydrogen gas and/or oxygen gas.

According to at least one example embodiment, the encapsulation mantle comprises a guiding surface arranged in a top portion of the encapsulation mantle, wherein the guiding surface is configured to guide any leaked gas to the gas sensor.

Hereby, the detection of leaking gas is improved. Thus, the gas sensor is typically arranged in the top portion of the encapsulation mantle.

According to at least one example embodiment, the first and second alkaline electrolyzer units are series or parallel connected.

That is, the first and second alkaline electrolyzer units may be electrically connected in series or in parallel.

According to at least one example embodiment, the first and second alkaline electrolyzer units are arranged to be operated as redundant units. Alternatively, they are arranged to be operated dependently of each other (or in common) to provide hydrogen gas.

According to at least one example embodiment, the operating temperature of each one of the first and second electrolyzer units is between 70° and 90° C. Such operating temperature may be referred to as the normal operating temperature. The operating pressure of each one of the first and second electrolyzer units may e.g. be between 1 and 30 bar.

According to at least one example embodiment, the alkaline electrolyte is potassium hydroxide, KOH, or sodium hydroxide, NaOH. For KOH, the concentration may e.g. be 57 M (molar).

According to at least one example embodiment, the material for the membranes used in the cell stacks is ZrO or NiO. The membrane may be stabilized with a mesh, e.g. a polyphenylene sulfide (PPS) mesh. The membrane may e.g. be comprised of a thin, porous foil. The thickness of such foil may e.g. be between 0.05 and 0.5 mm. However, a thickness of at least 0.25 is preferred in order to avoid mixing of gases. It should be understood that the membrane is non-conductive to electrons, thus avoiding electrical shorts between the anode and cathode of an electrolyzer cell, while allowing small distances between the electrodes. The membrane is configured to conduct the anions of OH, as the alkaline electrolyte may penetrate in pores of the membrane. Moreover, the membrane separates the gas (oxygen and hydrogen) produced on the separate sides of the membrane. It should be noted that the membrane may be referred to as a diaphragm or a separator.

According to at least one example embodiment, the anode, i.e. the electrode (and catalyst) used in the cell stack for the oxygen side, is a nickel coated steel electrode, e.g. a nickel coated perforated stainless-steel electrode.

According to at least one example embodiment, the cathode, i.e. the electrode (and catalyst) used in the cell stack for the hydrogen side, is a nickel coated steel electrode, e.g. a nickel coated perforated stainless-steel electrode.

Thus, the electrodes (and catalysts) used in the cell stack for the oxygen side and the hydrogen side may be of the same type. Stated differently, the anode and the cathode may be made out of the same material.

According to at least one example embodiment, each one of the first and second electrolyzer units comprises a porous transport layer at the anode or cathode. Such transport layer may be comprised of a Ni-mesh.

The arrangement may further comprise gas separator equipment for the produced oxygen and hydrogen, respectively, dryer equipment for drying the produced hydrogen gas, pumps or other transporting means of the alkaline solution and water, and associated electrical equipment needed for the operation of the arrangement, as known to the skilled person.

According to a second aspect of the invention, a hydrogen plant is provided. The hydrogen plant comprises a plurality of alkaline electrolyzer arrangements according to the first aspect of the invention. Thus, the alkaline electrolyzer units may be referred to as hydrogen producing alkaline electrolyzer units.

For example, a single alkaline electrolyzer unit may have the capacity corresponding to a few MW electricity demand, typically requiring the energy input of 4-5 kWh per produced Nm3 H2 (Normal Cubic meter). For example, the hydrogen plant may comprise between 50 and 150 alkaline electrolyzer units, corresponding to an electricity demand of 1 GW.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

Further advantages and features of the present invention are disclosed and discussed in the following description and the accompanying drawings.

BRIEF DESCRIPTION OF THE DRAWINGS

These and other aspects of the present invention will now be described in more detail, with reference to the appended drawings showing example embodiments of the invention, wherein.

DETAILED DESCRIPTION

In the following description, for purposes of explanation and not limitation, specific details are set forth such as particular components, interfaces, techniques, etc. in order to provide a thorough understanding of the present invention. However, it will be apparent to those skilled in the art that the present invention may be practiced in other embodiments that depart from these specific details. In other instances, detailed descriptions of well-known units, devices or systems, electrolyzer cells, and methods are omitted so as not to obscure the description of the present invention with unnecessary detail.

Figure 1:
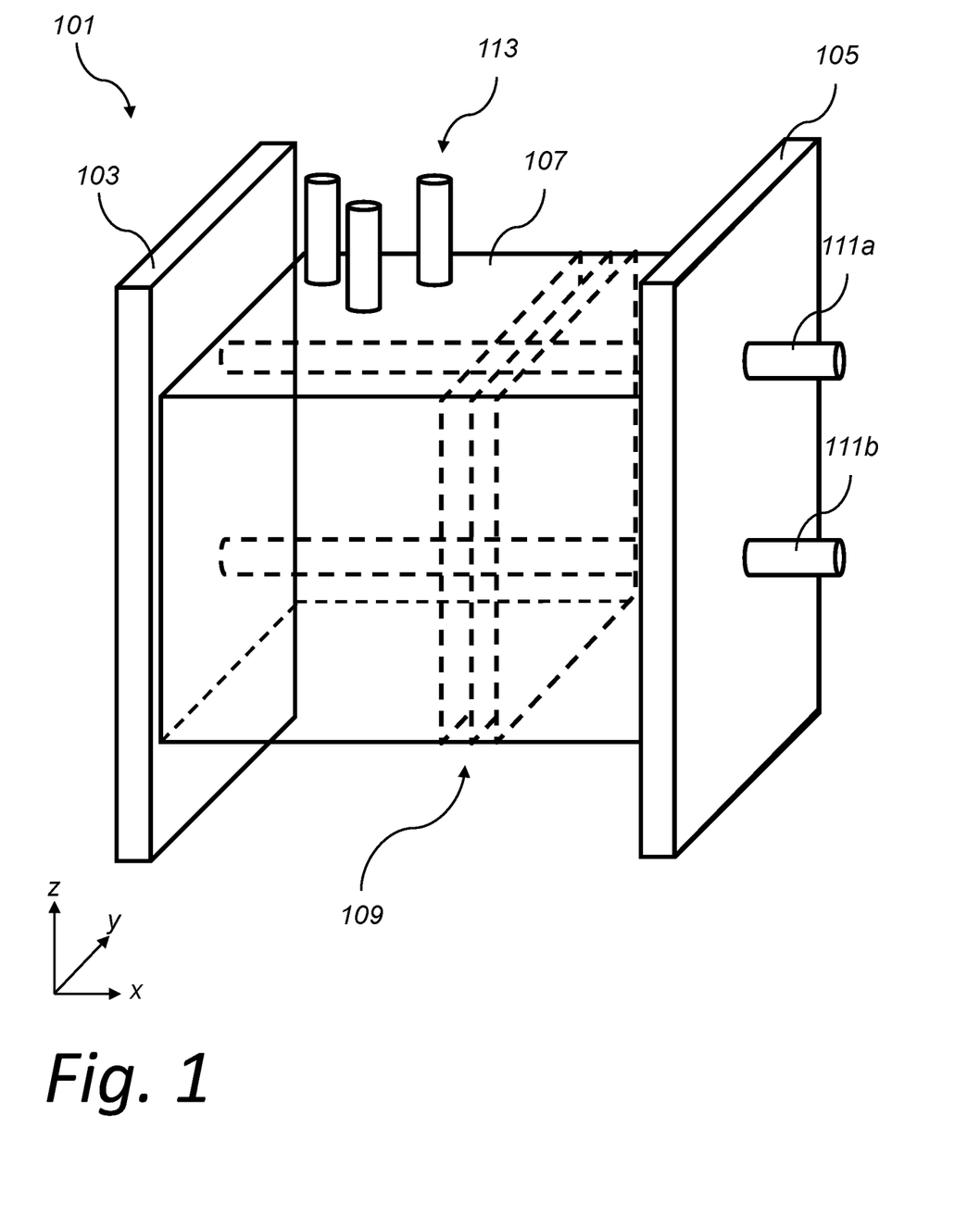
FIG. 1 is a perspective view of an alkaline electrolyzer unit used in accordance with example embodiments of the invention.

FIG. 1 schematically shows an alkaline electrolyzer unit 101 for producing hydrogen gas. The alkaline electrolyzer unit 101 may be used as the first and/or second alkaline electrolyzer unit of an alkaline electrolyzer arrangement as explained in the following. Thus, first the alkaline electrolyzer unit 101 is generally described, and then various embodiments of an alkaline electrolyzer arrangement comprising a first alkaline electrolyzer unit and a second alkaline electrolyzer unit is described.

The alkaline electrolyzer unit 101 comprises a first end plate 103, a second end plate 105, and a cell stack 107 arranged between the first and second end plates 103, 105. The cell stack 107 is formed of a plurality of electrolyzer cells 109, of which only three are schematically shown in FIG. 1. However, the cell stack 107 typically comprises more electrolyzer cells, e.g. between 50 and 700 electrolyzer cells, typically between 150 and 500 electrolyzer cells. A typical electrolyzer cell is described below with reference to FIG. 2. The alkaline electrolyzer unit 101 further comprises two connecting rods 111a, 111b arranged to extend from the first end plate 103 to the second end plate 105, to compress the electrolyzer cells 109 in the cell stack 107. The two connecting rods 111a, 111b of FIG. 1 are shown as partly dashed as they are extending through the cell stack 107. The connecting rods 111a, 111b may e.g. be attached to each one of the first and second end plates 103, 107 by means of nuts or screw-nuts (not shown).

The cell stack 107 of the alkaline electrolyzer unit 101 in FIG. 1 is connecting to piping 113 for transporting produced gases from the cell stack 107, and/or for transporting an alkaline electrolyte to and/or from the cell stack 107, as will be described in more detail below.

Figure 2:
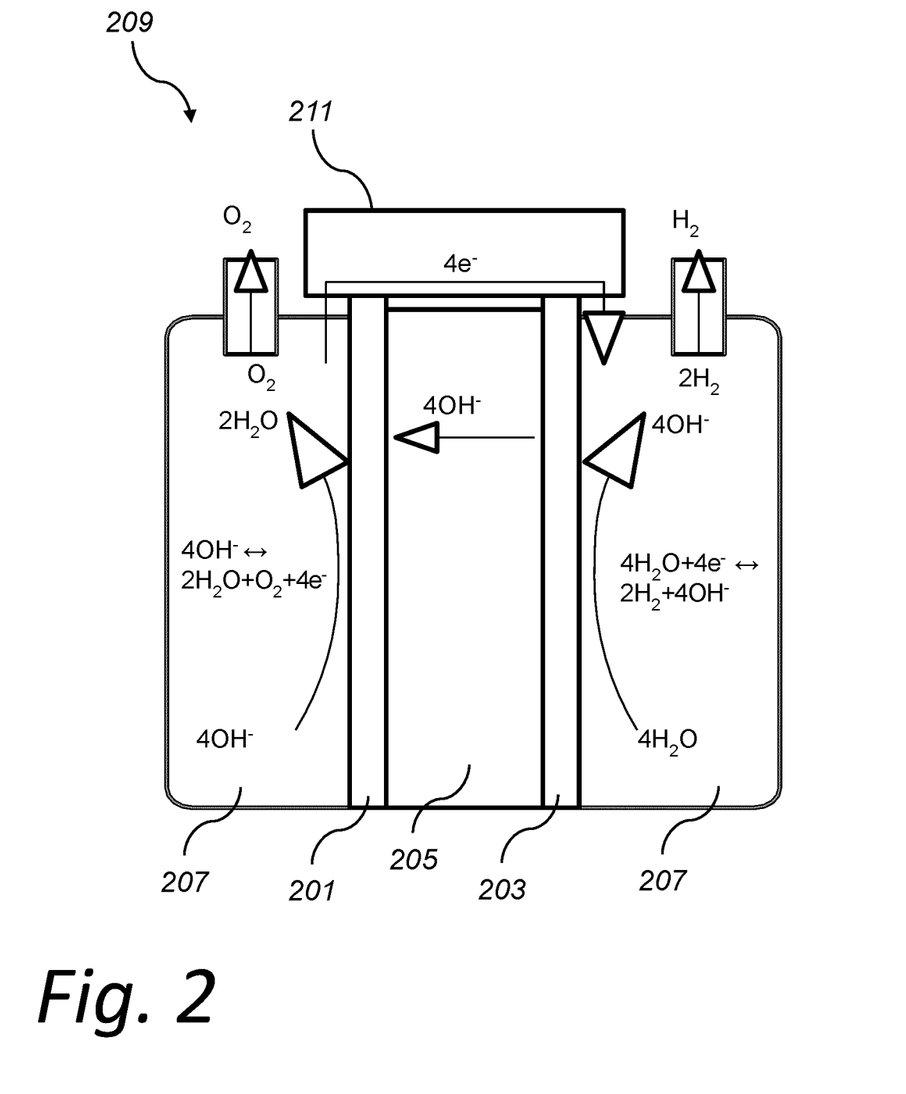
FIG. 2 is a schematic view of an electrolyzer cell used in the alkaline electrolyzer units in accordance with example embodiments of the invention, FIG. 3 schematically illustrates an alkaline electrolyzer arrangement comprising a first electrolyzer unit and a second alkaline electrolyzer unit in accordance with at least one example embodiment of the invention, FIG. 4A schematically illustrates a load bearing structure comprising a load bearing surface used in accordance with at least one example embodiment of the invention, FIG. 4B schematically illustrates another load bearing structure comprising a load bearing surface used in accordance with at least one example embodiment of the invention.

FIG. 2 schematically shows an electrolyzer cell 209. The electrolyzer cell 209 of FIG. 2 may be used for each one of the plurality of electrolyzer cells 109 of the cell stack 107 of FIG. 1. The electrolyzer cell 209 comprises a first electrode 201 being an anode 201, and a second electrode 203 being a cathode 203. The anode 201 and the cathode 203 are separated by a membrane 205. The anode 201 and the cathode 203 are operating in a liquid alkaline electrolyte solution 207, hereafter simply referred to as an alkaline electrolyte 207, to achieve water electrolysis. In use, oxygen gas and water are produced at the anode 201 by means of anions of OH, and hydrogen gas and anions of OH are produced at the cathode 203 by means of supplied electrons. The electrons are transferred from the anode side to the cathode side by means of an electron transfer bridge 211. The anions of OH is transported from the cathode 203 to the anode 201 via the membrane 205. The cell stack 107 of the alkaline electrolyzer unit 101 of FIG. 1 typically comprises a plurality of such electrolyzer cells 209.

Figure 3:
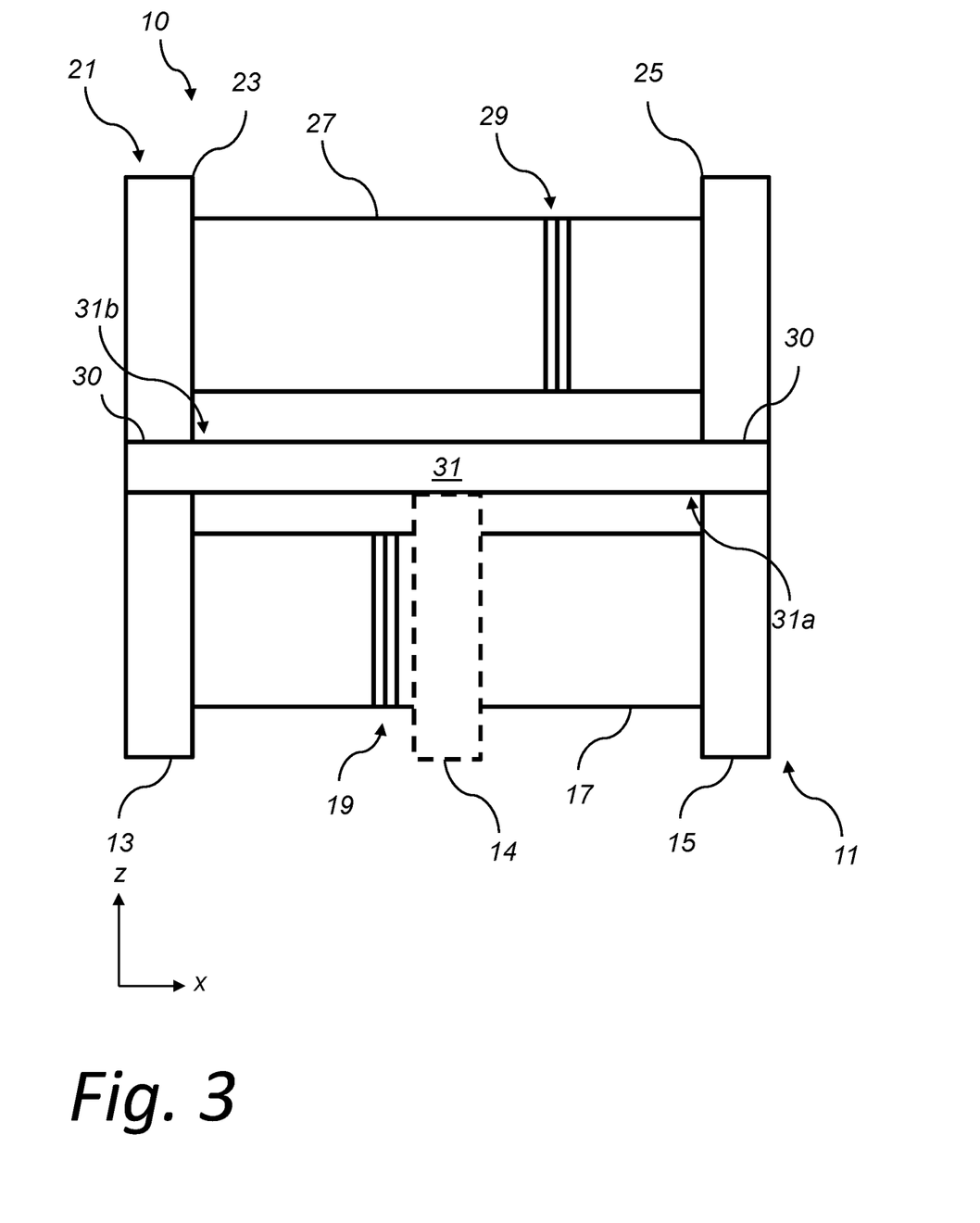

FIG. 3 schematically shows an alkaline electrolyzer arrangement 10 for producing hydrogen gas. The alkaline electrolyzer arrangement 10 comprises two alkaline electrolyzer units 11, 21, however a higher number than two alkaline electrolyzer units may be comprised in the alkaline electrolyzer arrangement 10. Each one of the two alkaline electrolyzer units 11, 21 may preferably be configured as the alkaline electrolyzer unit 101 of FIG. 1. That is, a first alkaline electrolyzer unit 11 comprises a first end plate 13, a second end plate 15 and a plurality of electrolyzer cells 19 (of which only three are shown) forming a cell stack 17 arranged between the first and second end plates 13, 15. Correspondingly, a second alkaline electrolyzer unit 21 comprises a first end plate 23, a second end plate 25 and a plurality of electrolyzer cells 29 (of which only three are shown) forming a cell stack 27 arranged between the first and second end plates 23, 25. As shown in FIG. 3, the first alkaline electrolyzer unit 11 may optionally comprise an intermediate load bearing plate 14 (shown with dashed lines) arranged separately, and between, the first and second end plates 13, 15. Such intermediate load bearing plate 14 is typically arranged to encompass a portion of the cell stack 17, or comprises a centre structure forming a part of the cell stack 17 (shown further in FIG. 4C). Any piping and connecting rods as shown in FIG. 1 has been removed for brevity.

The alkaline electrolyzer arrangement 10 further comprises a load bearing surface 30 arranged between the first alkaline electrolyzer unit 11 and the second alkaline electrolyzer unit 21 such that the second alkaline electrolyzer unit 21 is arranged vertically above the first alkaline electrolyzer unit 11 and is supported by the load bearing surface 30. In the embodiment of FIG. 3, the load bearing surface 30 is comprised in the first alkaline electrolyzer unit 11 by being integrated as a load bearing structure 31 being a planar structure 31 extending from the first end plate 13 to the second end plate 15. In FIG. 3, the load bearing properties may be improved by the optional intermediate load bearing plate 14. Thus, the load bearing structure 31 is supported by the first and second end plates 13, 15, and the intermediate load bearing plate 14. Thus, the second alkaline electrolyzer unit 21 is at least partly supported by the intermediate load bearing plate 14.

However, as an alternative, the load bearing surface 30 may be comprised, or integrated, in the second alkaline electrolyzer unit 21.

Figure 4A:
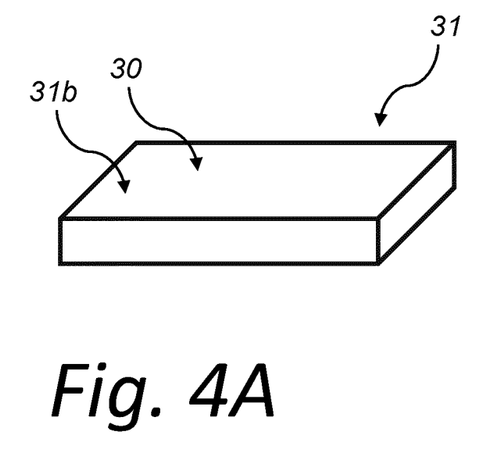
Figure 4B:
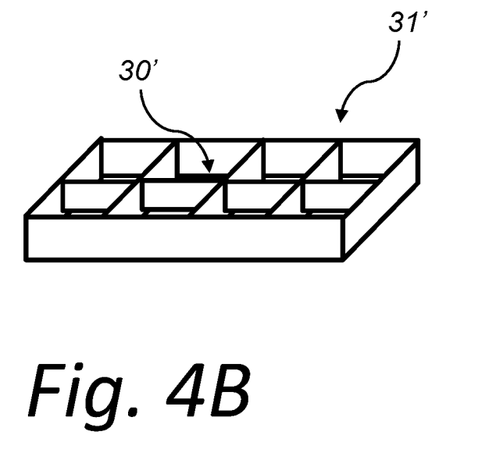

The planar structure 31 comprises an inner facing surface 31a arranged to face the cell stack 17 of the first alkaline electrolyzer unit 11, and an outer facing surface 31b arranged to face the second alkaline electrolyzer unit 21. Thus, the outer facing surface 31b comprises, or forms, the load bearing surface 30. The load bearing structure 31 being a planar structure 31 is typically formed as a cuboid, as is separately shown in a perspective view in FIG. 4A. According to at least one example embodiment, the load bearing structure which comprises the load bearing surface 30' is formed as a lattice or grid 31', as shown in FIG. 4B. Hereby, an advantageous combination of low weight and sufficient load bearing properties is provided.

As shown in FIGS. 1 and 3, the electrolyzer cells 109, 19, 29 in the respective cell stack 107, 17, 27 of the alkaline electrolyzer units 101, 11, 21 are stacked horizontally. In a Cartesian coordinate system, or a xyz-system, defined by an x-axis, y-axis and z-axis (as shown in the perspective view of FIG. 1, in FIG. 3 only the z-axis and the x-axis are shown), the horizontal plane is defined by the x-axis and the y-axis (i.e. an xy-plane) and the z-axis is a vertical axis perpendicularly cutting through the horizontal plane. In other words, the z-axis, or vertical axis, is parallel to an axis for which the force of gravity follows. Thus, for the horizontal cell stacks 107, 17, 27, the electrolyzer cells 109, 19, 29 are sandwiched in a horizontal direction, or along the x-axis as shown in FIG. 3. Thus, the first end plate 103, 13, 23, the cell stack 107, 17, 27, and the second end plate 105, 15, 25 are arranged sequentially in the horizontal direction (along the x-axis or y-axis). In other words, the centre axis of the first and second alkaline electrolyzer units 101, 11, 21 is a horizontal axis. Typically, each electrolyzer cell 109, 19, 29 in such horizontal stack arrangement comprises electrodes 201, 203 and membranes 205 sandwiched in a horizontal direction, or along the x-axis or y-axis.

Figure 5:
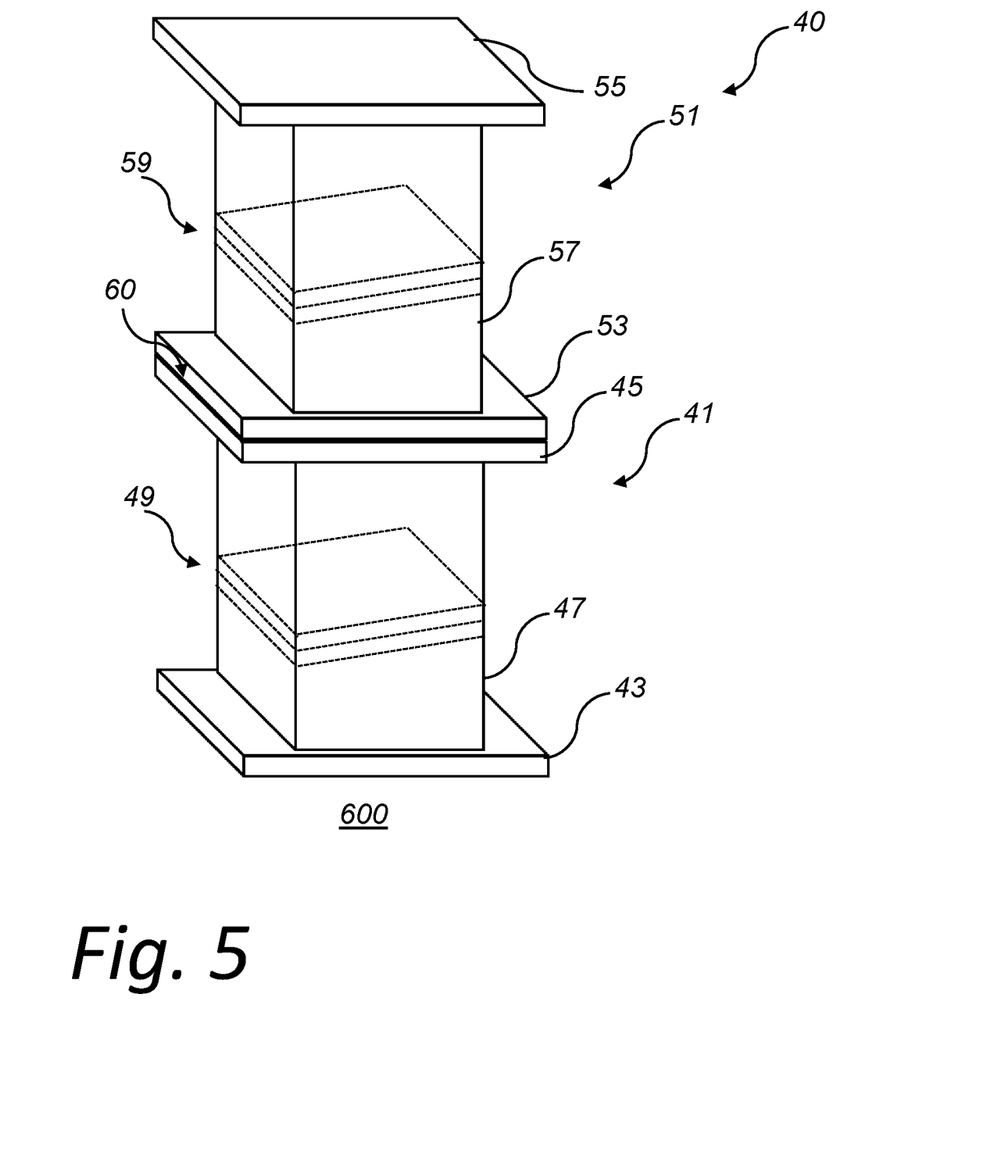
FIG. 5 is a schematical perspective view of an alkaline electrolyzer arrangement comprising a first alkaline electrolyzer unit and a second alkaline electrolyzer unit in accordance with at least one example embodiment of the invention.

However, according to at least one example embodiment as shown in FIG. 5, the electrolyzer cells in the respective cell stack of the first and second alkaline electrolyzer units are stacked vertically. FIG. 5 schematically shows a perspective view of an alkaline electrolyzer arrangement 40 for producing hydrogen gas, in principle similar to the alkaline electrolyzer arrangement 10 of FIG. 3, but with certain structural differences as will be described in the following. The alkaline electrolyzer arrangement 40 of FIG. 5 comprises two alkaline electrolyzer units, a first alkaline electrolyzer unit 41 and a second alkaline electrolyzer unit 51, however a higher number than two alkaline electrolyzer units may be comprised in the alkaline electrolyzer arrangement 40. Each one of the two alkaline electrolyzer units 41, 51 may preferably be configured as the alkaline electrolyzer unit 101 of FIG. 1, but with a vertical stack arrangement instead of the horizontal stack arrangement. That is, the first alkaline electrolyzer unit 41 comprises a first end plate 43, a second end plate 45 and a plurality of electrolyzer cells 49 (of which only three are shown) forming a cell stack 47 arranged between the first and second end plates 43, 45, and wherein the electrolyzer cells 49 in the cell stack 47 are stacked vertically. Correspondingly, the second alkaline electrolyzer unit 51 comprises a first end plate 53, a second end plate 55 and a plurality of electrolyzer cells 59 (of which only three are shown) forming a cell stack 57 arranged between the first and second end plates 53, 55, and wherein the electrolyzer cells 59 in the cell stack 57 are stacked vertically. Hereby, the capacity per surface area can be increased even further.

In more detail, the first end plate 43 of the first alkaline electrolyzer unit 41 is arranged on a ground surface 600 of the electrolyzer site for the alkaline electrolyzer arrangement 40. The second end plate 45 of the first alkaline electrolyzer unit 41 is aligned with, and arranged above, the first end plate 43 such that the vertically arranged cell stack 47 of the first alkaline electrolyzer unit 41 is arranged in between the first and second end plates 43, 45 with regards to the vertical direction. The second end plate 45, or rather an outer facing surface of the second end plate 45 comprises the load bearing surface 60 which the second alkaline electrolyzer unit 51 is supported upon. Thus, the first end plate 53 of the second alkaline electrolyzer unit 51 is arranged on the second end plate 45 of the first alkaline electrolyzer unit 41. The second end plate 55 of the second alkaline electrolyzer unit 51 is aligned with, and arranged above, the first end plate 53 such that the vertically arranged cell stack 57 of the second alkaline electrolyzer unit 51 is arranged in between the first and second end plates 53, 55, with regards to the vertical direction, and arranged vertically above the first alkaline electrolyzer unit 41. Thus, the second alkaline electrolyzer unit 51 is arranged on top of the first alkaline electrolyzer unit 41 by means of the second end plate 45 of the first alkaline electrolyzer unit 41 and the load bearing surface 60 comprised therein.

Any piping and connecting rods as shown for the alkaline electrolyzer unit 101 of FIG. 1 has been removed for brevity. However, it should be noted that instead of having the second end plate 45 forming the load bearing surface 60 for the second alkaline electrolyzer unit 51, a respective end surface of at least two connecting rods configured to compress the electrolyzer cells 49 in the cell stack 47 may be arranged in contact with the first end plate 53 of the second alkaline electrolyzer unit 51 and thus form the load bearing surface. As a further alternative, a separate intermediate supporting plate may be arranged in between the second end plate 45 of the first alkaline electrolyzer unit 41 and the first end plate 53 of the second alkaline electrolyzer unit 51.

As seen in FIG. 5, the electrolyzer cells 49, 59 of the respective cell stack 47, 57 are inclined, or tilted, relative to the horizontal plane (xy-plane). Thus, the electrodes 201, 203 and/or the membranes 205 of the electrolyzer cells 49, 59 are inclined, or tilted, relative to the horizontal plane in order to avoid gas traps. The angle of the inclination of such tilting relative the horizontal plane may e.g. be between 5° and 45°.

Figure 6:
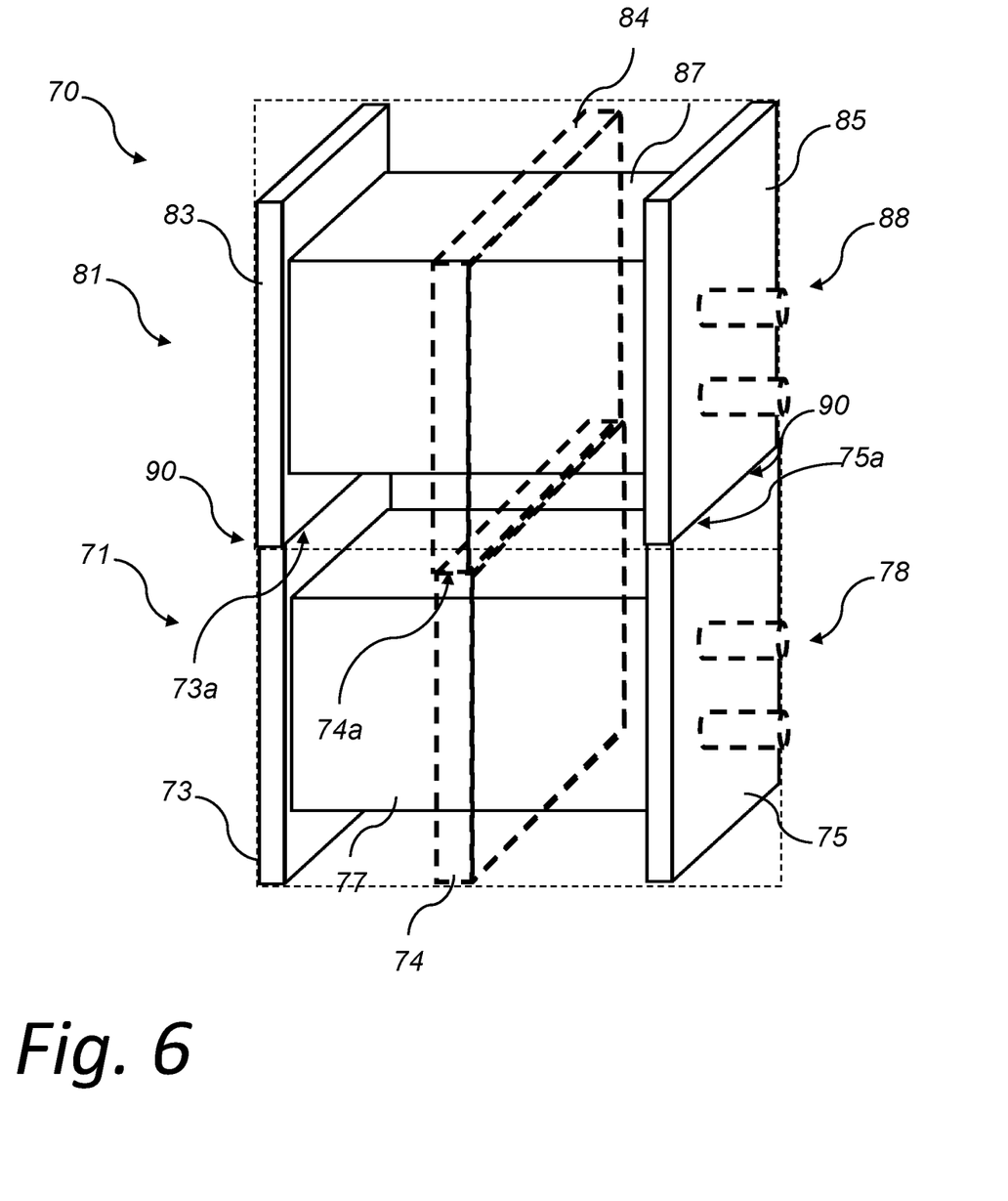
FIG. 6 is another schematical perspective view of an alkaline electrolyzer arrangement comprising a first alkaline electrolyzer unit and a second alkaline electrolyzer unit in accordance with at least one embodiment of the invention, and FIG. 7 schematically illustrates yet another alkaline electrolyzer arrangement comprising a first alkaline electrolyzer unit and a second alkaline electrolyzer unit in accordance with at least one example embodiment of the invention.

FIG. 6 schematically shows a perspective view of an alkaline electrolyzer arrangement 70 for producing hydrogen gas, in principle similar to the alkaline electrolyzer arrangement 10 of FIG. 3, but with certain structural differences as will be described in the following. The alkaline electrolyzer arrangement 70 of FIG. 6 comprises two alkaline electrolyzer units, a first alkaline electrolyzer unit 71 and a second alkaline electrolyzer unit 81, however a higher number than two alkaline electrolyzer units may be comprised in the alkaline electrolyzer arrangement 70. Each one of the two alkaline electrolyzer units 71, 81 may preferably be configured as the alkaline electrolyzer unit 101 of FIG. 1 (i.e. with horizontal cell stacks). That is, the first alkaline electrolyzer unit 71 comprises a first end plate 73, a second end plate 75 and a plurality of electrolyzer cells (not shown separately) forming a cell stack 77 arranged between the first and second end plates 73, 75. Correspondingly, the second alkaline electrolyzer unit 81 comprises a first end plate 83, a second end plate 85 and a plurality of electrolyzer cells (not shown separately) forming a cell stack 87 arranged between the first and second end plates 83, 85.

Optionally, the first alkaline electrolyzer unit 71 comprises an intermediate load bearing plate 74 similar to that shown in FIG. 3. For example, the intermediate load bearing plate 74 is arranged as described with reference to FIG. 4C. Thus, the intermediate load bearing plate 74 is arranged between the first and second end plates 73, 75 of the first alkaline electrolyzer unit 71. Correspondingly, the second alkaline electrolyzer unit 81 may comprise an intermediate plate 84 arranged between the first and second end plates 83, 85 of the second alkaline electrolyzer unit 81. The intermediate plate 84 of the second alkaline electrolyzer unit 81 may be arranged as described with reference to FIG. 4C.

Compared to the alkaline electrolyzer arrangement 10 of FIG. 3, there is no separate load bearing structure in the alkaline electrolyzer arrangement 70 of FIG. 3, instead the load bearing surface 90 is comprised in the first and second end plates 73, 75 of the first alkaline electrolyzer unit 71, and optionally in the intermediate load bearing plate 74. Hereby, the load bearing surface 90 is integrated into already existing components of the first alkaline electrolyzer unit 71. Thus, there is no need for a separate load bearing structure comprising the load bearing surface.

As shown in FIG. 6, the load bearing surface 90 is typically divided between a top surface 73a of the first end plate 73 and a top surface 75a of the second end plate 75, on which the respective first and second end plates 83, 85 of the second alkaline electrolyzer unit 81 are supported upon. For embodiments including the intermediate load bearing plate 74 of the first alkaline electrolyzer unit 71, and the intermediate plate 84 of the second alkaline electrolyzer unit 81, the load bearing surface 90 is furthermore included in a top surface 74a of the intermediate load bearing plate 74 on which the intermediate plate 84 of the second alkaline electrolyzer unit 81 is supported upon. Thus, the load bearing surface 90 comprises at least two separate load bearing surface portions 73a, 75a, and optionally the top surface portion 74a. Thus, the first end plate 83 of the second alkaline electrolyzer unit 81 is arranged on top of the first end plate 73 of the first alkaline electrolyzer unit 71, and the second end plate 85 of the second alkaline electrolyzer unit 81 is arranged on top of the second end plate 75 of the first alkaline electrolyzer unit 71, and optionally, the intermediate plate 84 of the second alkaline electrolyzer unit 81 is arranged on top of the intermediate load bearing plate 74 of the first alkaline electrolyzer unit 71. Thus, the first and second end plates 83, 85, and the horizontally arranged cell stack 87 arranged therebetween, of the second alkaline electrolyzer unit 81 are arranged vertically above the first alkaline electrolyzer unit 71. Moreover, as the first and second end plates 73, 75, as well as the optional intermediate load bearing plate 74, of the first alkaline electrolyzer unit 71 typically are load carrier plates, the load bearing surface 90 is integrated into the main carrier structure of the first alkaline electrolyzer unit 71. Moreover, as clearly shown in FIG. 6, any connecting rods 78, 88 of the first and second alkaline electrolyzer units 71, 81 are distant, and different to, the load bearing surface 90.

Figure 4C:
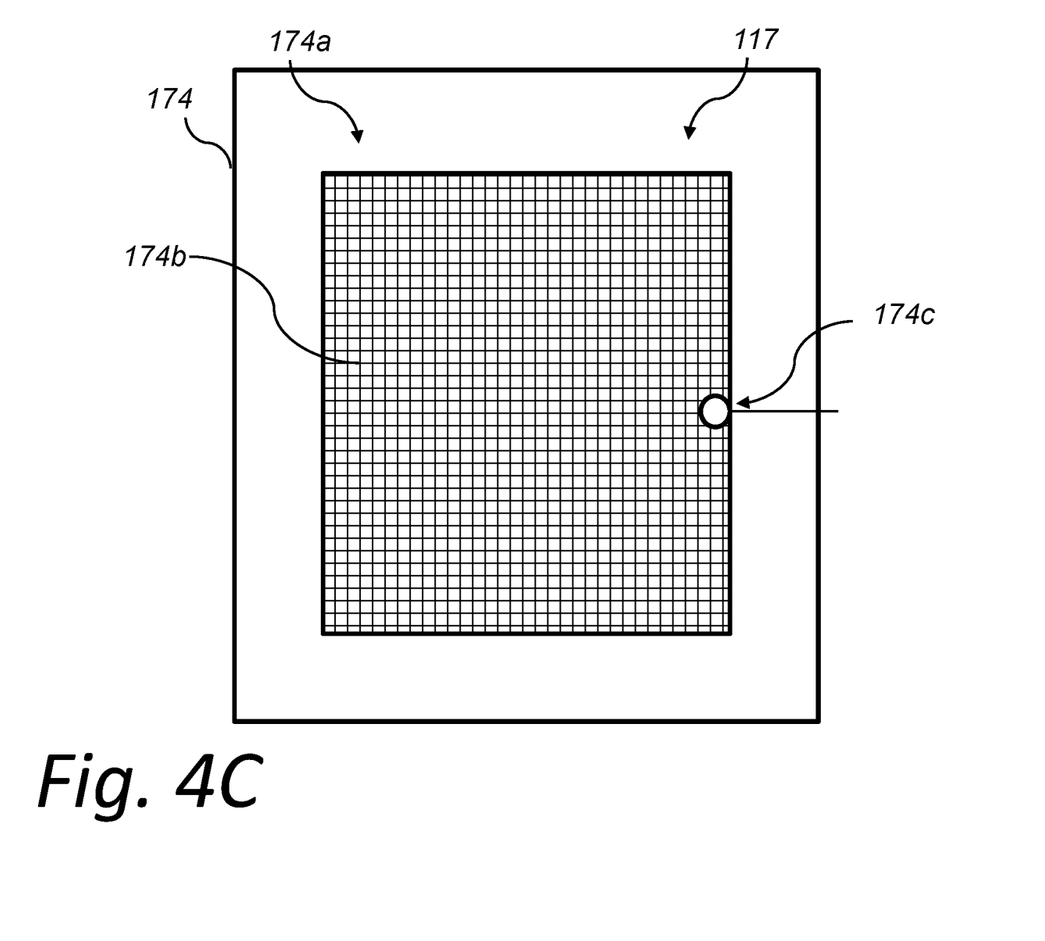
FIG. 4C is a front view of an intermediate plate e.g. of the alkaline electrolyzer arrangement of FIG. 3, in accordance with at least one example embodiment of the invention.

FIG. 4C schematically show a front view of an example intermediate plate 174 to be arranged between a first end plate and a second end plate of an alkaline electrolyzer unit. The intermediate plate 174 may e.g. be an intermediate load bearing plate of the first alkaline electrolyzer unit, as e.g. the intermediate load bearing plate 14 of the embodiment of FIG. 3, or the intermediate load bearing plate 74 of the embodiment of FIG. 6. Additionally, the intermediate plate 174 may be the intermediate plate of the second alkaline electrolyzer unit, as e.g. the intermediate plate 84 of the embodiment of FIG. 6.

The intermediate plate 174 is typically arranged to comprise a centre structure 174a forming a part of a cell stack 117 (as e.g. any one of the cell stacks 17, 77, 87 of the embodiments of FIGS. 3 and 6). Such centre structure 174a may e.g. comprise a grid or lattice 174b enabling the alkaline electrolyte to flow therethrough. For example, the centre structure 174a is arranged in between two electrodes (not shown) and may form a dummy cell. A dummy cell is a cell in the cell stack 117 which does not produce hydrogen or oxygen, as there is no applied potential between the electrodes of the dummy cell. As an alternative, the intermediate plate 174 may simply comprise a frame encompassing a portion of the cell stack 117.

One or more sensors 174c configured to measure temperature, pressure and/or conductivity, may be integrated in the intermediate plate 174. Such integration is advantageous as the sensor(s) 174c easily can be arranged in a mid-section of the cell stack owing to the arrangement of the intermediate plate 174.

Figure 7:
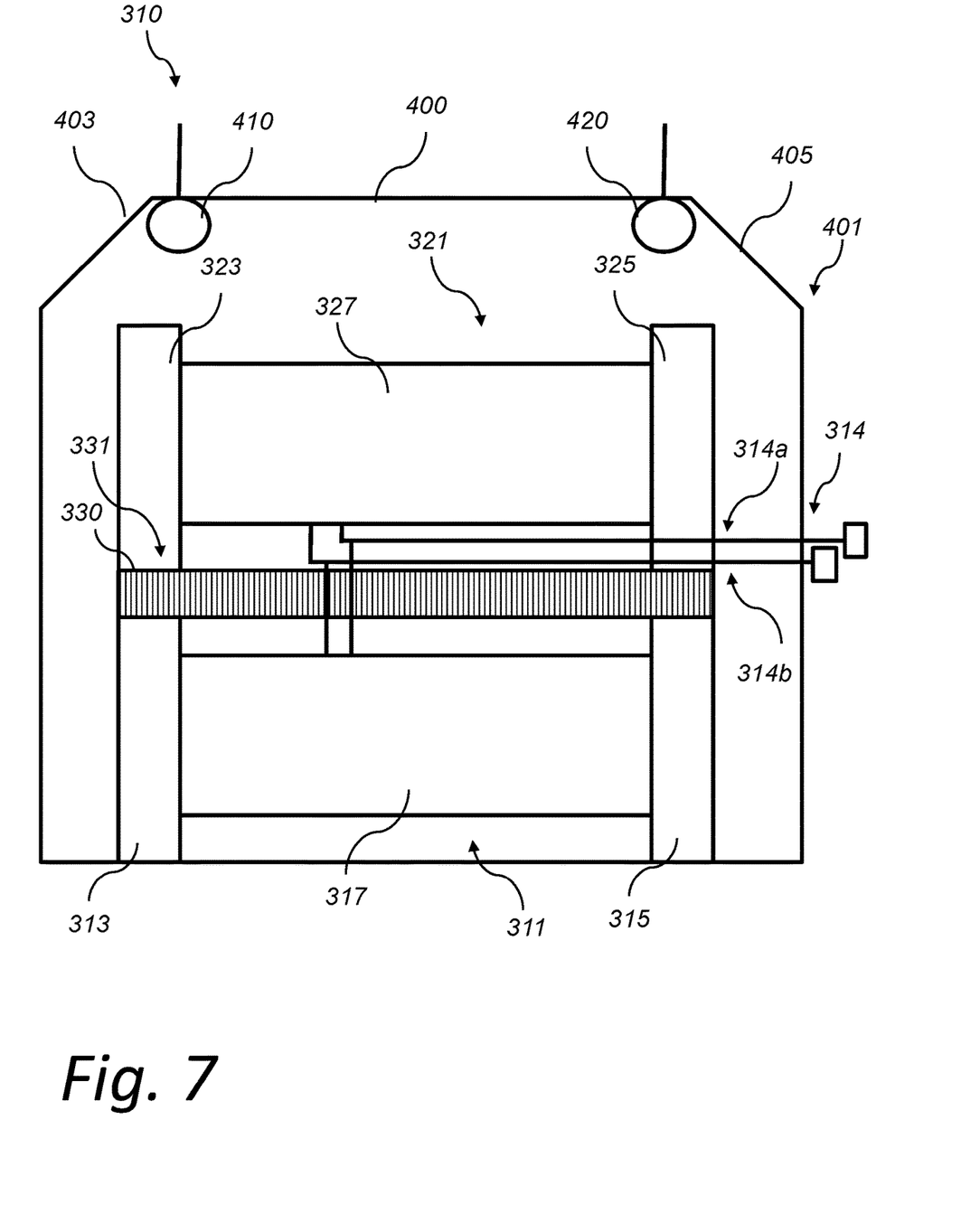

FIG. 7 schematically shows a perspective view of an alkaline electrolyzer arrangement 310 for producing hydrogen gas, in principle similar to the alkaline electrolyzer arrangement 10 of FIG. 3, but with certain structural differences as will be described in the following. The alkaline electrolyzer arrangement 310 of FIG. 7 comprises two alkaline electrolyzer units, a first alkaline electrolyzer unit 311 and a second alkaline electrolyzer unit 321, however a higher number than two alkaline electrolyzer units may be comprised in the alkaline electrolyzer arrangement 310. Each one of the two alkaline electrolyzer units 311, 321 may preferably be configured as the alkaline electrolyzer unit 101 of FIG. 1 (i.e. with horizontal cell stacks). That is, the first alkaline electrolyzer unit 311 comprises a first end plate 313, a second end plate 315 and a plurality of electrolyzer cells (not shown separately) forming a cell stack 317 arranged between the first and second end plates 313, 315. Correspondingly, the second alkaline electrolyzer unit 321 comprises a first end plate 323, a second end plate 325 and a plurality of electrolyzer cells (not shown separately) forming a cell stack 327 arranged between the first and second end plates 323, 325.

Similar to the alkaline electrolyzer arrangement 10 of FIG. 3, the first alkaline electrolyzer unit 311 comprises a load bearing structure 331 extending from the from the first end plate 313 to the second end plate 315. The load bearing structure 331 comprises a load bearing surface 330 as previously described, and is in the embodiment shown in FIG. 7 arranged as a lattice or grid (as e.g. shown in FIG. 4B). Thus, the load bearing structure 331 and the load bearing surface 330 are arranged between the first alkaline electrolyzer unit 311 and the second alkaline electrolyzer unit 321 such that the second alkaline electrolyzer unit 321 is arranged vertically above the first alkaline electrolyzer unit 311 and is supported by the load bearing surface 330. Owing to the lattice or grid of the load bearing structure 331, piping 314 may advantageously extend from the cell stack 317 of the first alkaline electrolyzer unit 311, through the load bearing structure 331, and interact with a piping portion above the load bearing structure 331.

As shown in FIG. 7, the alkaline electrolyzer arrangement 310 of FIG. 7 comprises piping 314 configured to transport produced gas from the electrolyzer cells of the cell stacks 317, 327. The piping 314 is arranged vertically in between the first and second alkaline electrolyzer units 311, 321. In more detail, the piping 314 comprises a first piping system 314a for handling the produced hydrogen gas, and a second piping system 314b for handling the produced oxygen gas. As shown in the embodiment of FIG. 7, the first and second piping systems 314a, 314b are separated from each other. The first and the second alkaline electrolyzer units 311, 321 are in FIG. 7 arranged to provide the produced gas commonly to the first and second piping systems 314a, 314b. However, the first and the second alkaline electrolyzer units 311, 321 may as well be arranged to provide separate piping systems with produced gas.

The alkaline electrolyzer arrangement 310 of FIG. 7 comprises an encapsulation mantle 400 housing the first and the second alkaline electrolyzer units 311, 321. Hereby, any leaking gas from the first and second alkaline electrolyzer units 311, 321 may be trapped inside the encapsulation mantle 400. As also shown in FIG. 7, the alkaline electrolyzer arrangement 310 comprises a first gas sensor 410 and a second gas sensor 420, both being configured to detect any leaking gas from the first and second alkaline electrolyzer units 311, 321. The first and second gas sensors are arranged within the encapsulation mantle 400 vertically above the second alkaline electrolyzer unit 321. Thus, an efficient means for detecting leaking gas is provided, as any leaked gas typically moves upwards in the encapsulation mantle 400. The first and second gas sensors are typically configured to detect hydrogen gas and/or oxygen gas.

According to at least one example embodiment, the encapsulation mantle 400 comprises guiding surfaces 403, 405 arranged in a top portion 401 of the encapsulation mantle 400, the guiding surfaces being configured to guide any leaked gas to the respective first and second gas sensors 410, 420. That is, a first guiding surface 403 is configured to guide any leaked gas to the first gas sensor 410, typically being inclined towards the first gas sensor 410. Correspondingly, a second guiding surface 405 is configured to guide any leaked gas to the second gas sensor 420, typically being inclined towards the second gas sensor 420. Hereby, the detection of leaking gas is improved.

While the invention has been described in connection with what is presently considered to be most practical and preferred embodiments, it is to be understood that the invention is not to be limited to the disclosed embodiments, but on the contrary, is intended to cover various modifications and equivalent arrangements. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An alkaline electrolyzer arrangement for producing hydrogen gas, the arrangement comprising:
   a first alkaline electrolyzer unit and a second alkaline electrolyzer unit, each one of the first and second alkaline electrolyzer units including a first end plate, a second end plate and a plurality of electrolyzer cells forming a cell stack arranged between the first and second end plates, each electrolyzer cell includes a liquid alkaline electrolyte, and
   a load bearing surface arranged between the first alkaline electrolyzer unit and the second alkaline electrolyzer unit such that the second alkaline electrolyzer unit is arranged vertically above the first alkaline electrolyzer unit and is supported by the load bearing surface, wherein the load bearing surface is integrated in at least one of the first and second end plates of the first alkaline electrolyzer unit.

2. The arrangement according to claim 1, wherein the electrolyzer cells in the respective cell stack of the first and second alkaline electrolyzer units are vertically stacked.

3. The arrangement according to claim 1, wherein the electrolyzer cells in the respective cell stack of the first and second alkaline electrolyzer units are horizontally stacked.

4. The arrangement according to claim 3, further comprising an intermediate load bearing plate arranged between the first and second end plates of the first alkaline electrolyzer unit, wherein the second alkaline electrolyzer unit is at least partly supported by the intermediate load bearing plate.

5. The arrangement according to claim 1, wherein at least the first alkaline electrolyzer unit further includes at least one connecting rod arranged to extend from the first end plate to the second end plate and being configured to compress the electrolyzer cells in the cell stack, wherein the load bearing surface is distant to the at least one connecting rod.

6. The arrangement according to claim 1, further comprising piping configured to transport produced gas from the electrolyzer cells of the cell stacks, wherein the piping is arranged vertically in between the first and second alkaline electrolyzer units.

7. The arrangement according to claim 1, wherein the load bearing surface is horizontally arranged.

8. The arrangement according to claim 1, further comprising an encapsulation mantle housing the first and the second alkaline electrolyzer units.

9. An alkaline electrolyzer arrangement for producing hydrogen gas, the arrangement comprising:
   a first alkaline electrolyzer unit and a second alkaline electrolyzer unit, each one of the first and second alkaline electrolyzer units including a first end plate, a second end plate and a plurality of electrolyzer cells forming a cell stack arranged between the first and second end plates,
   a load bearing surface arranged between the first alkaline electrolyzer unit and the second alkaline electrolyzer unit such that the second alkaline electrolyzer unit is arranged vertically above the first alkaline electrolyzer unit and is supported by the load bearing surface, wherein the load bearing surface is integrated in at least one of the first and second end plates of the first alkaline electrolyzer unit,
   an encapsulation mantle housing the first and the second alkaline electrolyzer units, and
   a gas sensor configured to detect any leaking gas from the first and second alkaline electrolyzer units, wherein the gas sensor is arranged within the encapsulation mantle vertically above the second alkaline electrolyzer unit.

10. The arrangement according to claim 9, wherein the encapsulation mantle comprises a guiding surface arranged in a top portion of the encapsulation mantle, wherein the guiding surface is configured to guide any leaked gas to the gas sensor.

11. The arrangement according to claim 2, wherein the electrolyzer cells in the respective cell stack of the first and second alkaline electrolyzer units are horizontally stacked.

12. The arrangement according to claim 2, wherein at least the first alkaline electrolyzer unit further includes at least one connecting rod arranged to extend from the first end plate to the second end plate and being configured to compress the electrolyzer cells in the cell stack, wherein the load bearing surface is distant to the at least one connecting rod.

13. The arrangement according to claim 2, further comprising piping configured to transport produced gas from the electrolyzer cells of the cell stacks, wherein the piping is arranged vertically in between the first and second alkaline electrolyzer units.

14. The arrangement according to claim 2, wherein the load bearing surface is horizontally arranged.

15. The arrangement according to claim 2, further comprising an encapsulation mantle housing the first and the second alkaline electrolyzer units.

16. An alkaline electrolyzer arrangement for producing hydrogen gas, the arrangement comprising:
   a first alkaline electrolyzer unit having a first end plate, a second end plate, and a first plurality of electrolyzer cells forming a cell stack arranged between the first and second end plates, each of the first plurality of electrolyzer cells includes a liquid alkaline electrolyte,
   a second alkaline electrolyzer unit having a third end plate, a fourth end plate, and a second plurality of electrolyzer cells forming a cell stack arranged between the third and fourth end plates, the second alkaline electrolyzer unit being stackable on top of the first alkaline electrolyzer unit, each of the second plurality of electrolyzer cells includes a liquid alkaline electrolyte,
   the first alkaline electrolyzer unit further including a load bearing surface integrated in the first plate and/or the second end plate, wherein the load bearing surface supports the third end plate and/or the fourth end plate of the second alkaline electrolyzer unit such that the third and fourth end plates are arranged above the first and second end plates.

* * * * *